United States Patent
Satoh

(10) Patent No.: US 6,973,831 B2
(45) Date of Patent: Dec. 13, 2005

(54) ULTRASONIC IMAGING APPARATUS AND ULTRASONIC IMAGING METHOD

(75) Inventor: Tomoo Satoh, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/805,213

(22) Filed: Mar. 22, 2004

(65) Prior Publication Data

US 2004/0187582 A1 Sep. 30, 2004

(30) Foreign Application Priority Data

Mar. 25, 2003 (JP) .............................. 2003-083176

(51) Int. Cl.⁷ ........................................... G01N 29/00
(52) U.S. Cl. ...................................... 73/618; 73/620
(58) Field of Search ........................ 73/617–618, 606, 73/620, 622–633, 367; 367/7, 11, 103, 105; 600/443, 447, 458, 600

(56) References Cited

U.S. PATENT DOCUMENTS

| | | | |
|---|---|---|---|
| 5,140,558 A | * | 8/1992 | Harrison et al. ............... 367/7 |
| 5,144,954 A | * | 9/1992 | Satake ......................... 600/455 |
| 6,635,018 B2 | * | 10/2003 | Kawagishi et al. ......... 600/447 |
| 6,688,177 B2 | * | 2/2004 | Wiesauer ...................... 73/618 |

* cited by examiner

Primary Examiner—Helen Kwok

(74) Attorney, Agent, or Firm—Sughrue Mion, PLLC

(57) ABSTRACT

An ultrasonic imaging apparatus capable of scanning an object at a high speed while obtaining necessary information. The apparatus includes an ultrasonic probe for transmitting and receiving ultrasonic waves, an excitation timing controller for providing delays to a plurality of drive signals so as to scan the object by using the ultrasonic beam with a scanning line density, a phase matching calculating unit for processing electric signals obtained by receiving the ultrasonic echoes to obtain detection signals representing ultrasonic information along scanning lines respectively, a discontinuous region determining unit for determining continuity of a boundary of medium residing within the object on the basis of the plurality of detection signals, and a scan control unit for setting up a lower scanning line density and then a higher scanning line density for the excitation timing controller based on a determination result of the discontinuous region determining unit.

12 Claims, 17 Drawing Sheets

ULTRASONIC IMAGING APPARATUS AND ULTRASONIC IMAGING METHOD

BACKGROUND OF THE INVENTION

1. Field of the Invention

The present invention relates to an ultrasonic imaging apparatus and an ultrasonic imaging method to be used for diagnosis of internal organs in living bodies or nondestructive inspection by transmitting and receiving ultrasonic waves.

2. Description of a Related Art

Various imaging techniques have been developed in medical field in order to observe and diagnose the inside of objects. Among the above-mentioned techniques, different from other medical imaging techniques such as X-ray photography and RI (radio isotope) scintillation camera, ultrasonic imaging, which transmits and receives ultrasonic waves and thereby obtains internal information of an object to be inspected, is free from exposure to the radiation ray. As a highly safe imaging technique, the ultrasonic imaging is used in a wide field including diagnosis of baby in the womb in obstetric field, gynecology, circulatory organs, digestive system and so on.

Further, in the ultrasonic imaging, different from the above-mentioned imaging techniques such as X-ray photography, it is possible to display ultrasonic information, which is obtained by using a probe, on a display apparatus in real time. Therefore, for example, the ultrasonic imaging is particularly advantageous in such cases when observing an organ of which state changes every second like circulatory system.

However, in the ultrasonic imaging, a patient as the object to be inspected is placed under restraint while observing the organs or the like, and therefore, a large physical load is imposed to the patient. In order to reduce the time required for ultrasonic imaging, it is conceivable that the intervals for scanning the object by using ultrasonic beam are made rougher uniformly. However, in this case, information from the depth of the object cannot be easily obtained. The reason of that is as described below. That is, the ultrasonic echoes reflected by a structure residing in a deep region of the object are faint, and also, they overlap with transmitting time zone of the ultrasonic beams to be subsequently transmitted or echoes of the subsequently transmitted ultrasonic beams from a shallow region, which makes it difficult to detect such the reflected ultrasonic echoes. Accordingly, it is desired to develop such an apparatus and method capable of performing ultrasonic imaging of an object entirely at a high speed while obtaining information necessary for diagnosis.

SUMMARY OF THE INVENTION

The present invention has been achieved in view of the above-mentioned problems. An object of the present invention is to provide an ultrasonic imaging apparatus and ultrasonic imaging method capable of scanning an object at a high speed while obtaining necessary information.

In order to solve the above-described problems, an ultrasonic imaging apparatus according to the present invention comprises: an ultrasonic probe including a plurality of ultrasonic transducers for transmitting ultrasonic waves in accordance with a plurality of drive signals to form at least one ultrasonic beam toward an object to be inspected and receiving ultrasonic echoes reflected from the object; signal processing means at transmitting-side for providing delays to the plurality of drive signals to be supplied to the ultrasonic probe so as to scan the object by using the at least one ultrasonic beam transmitted from the ultrasonic probe with a scanning line density; signal processing means at receiving-side for processing a plurality of electric signals obtained by receiving the ultrasonic echoes to obtain a plurality of detection signals representing ultrasonic information along a plurality of scanning lines respectively; determination means for determining continuity of a boundary of medium residing within the object on the basis of the plurality of detection signals obtained by the signal processing means at receiving-side; and control means for setting up, after setting up a first scanning line density, a second scanning line density higher than the first scanning line density for the signal processing means at transmitting-side on the basis of a determination result of the determination means.

Further, an ultrasonic imaging method according to the present invention is a method of imaging an object to be inspected by using an ultrasonic probe including a plurality of ultrasonic transducers for transmitting ultrasonic waves in accordance with a plurality of drive signals to form at least one ultrasonic beam toward the object and receiving ultrasonic echoes reflected from the object, the method comprising the steps of: (a) scanning the object by using the at least one ultrasonic beam transmitted from the ultrasonic probe with a first scanning line density while providing delays to the plurality of drive signals to be supplied to the ultrasonic probe; (b) processing a plurality of electric signals obtained by receiving the ultrasonic echoes to obtain a plurality of detection signals representing ultrasonic information along a plurality of scanning lines respectively; (c) determining continuity of a boundary of medium residing within the object on the basis of the plurality of detection signals obtained at step (b); and (d) changing density of the plurality of scanning lines from a first scanning line density to a second scanning line density higher than the first scanning line density on the basis of a determination result at step (c) to scan the object.

According to the present invention, since the scanning line density is adaptively changed on the basis of the detected continuity of boundary of medium, the entire scanning region can be scanned at a high speed while obtaining minute ultrasonic information about the region where critical information is included.

DESCRIPTION OF THE PREFERRED EMBODIMENTS

Figure 1:
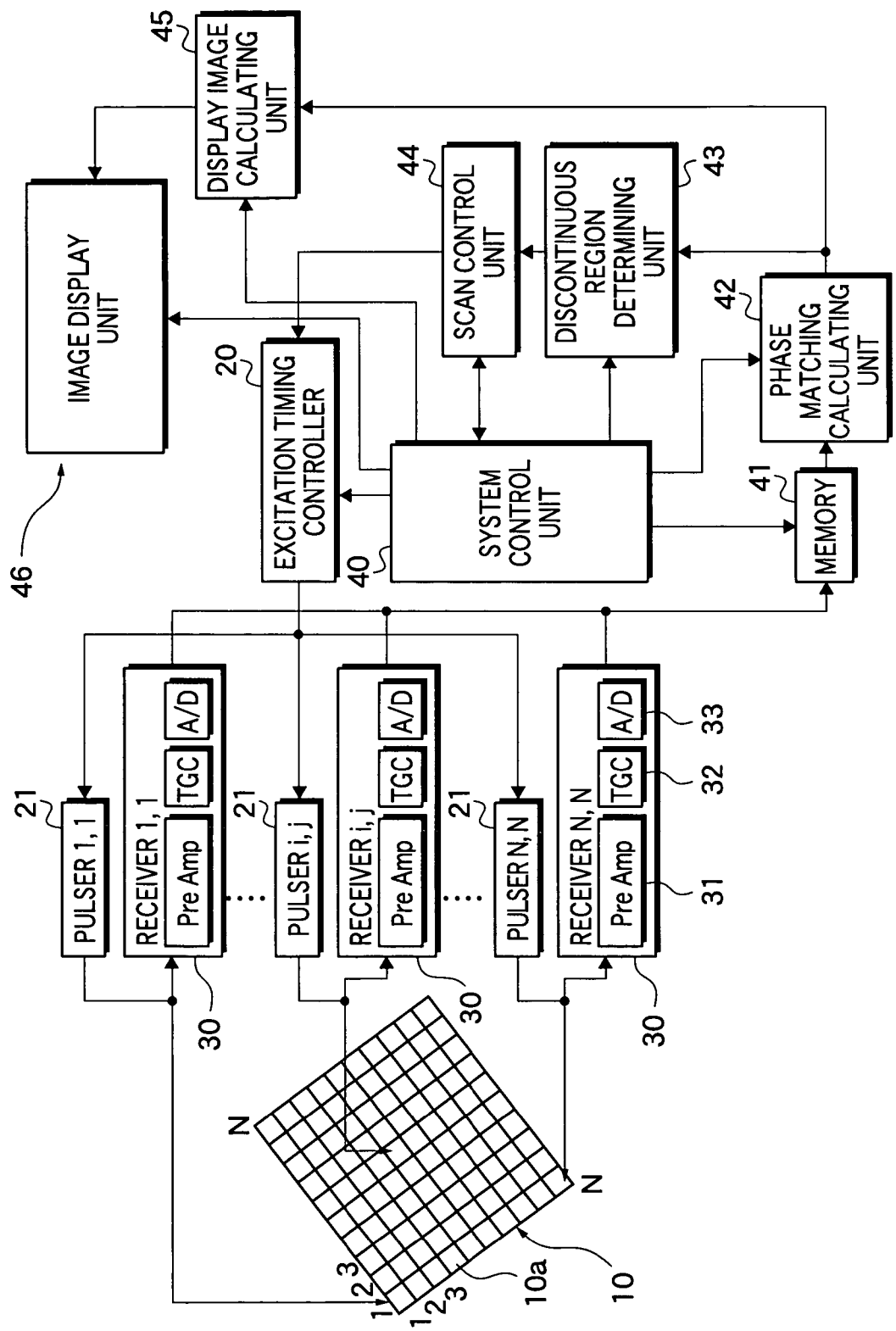
FIG. 1 is a block diagram showing the configuration of an ultrasonic imaging apparatus according to a first embodiment of the present invention.

Embodiments of the present invention will be described in detail below by referring to the drawings. The same constituent elements will be given with the same reference numerals and the descriptions thereof will be omitted.

FIG. 1 is a block diagram showing the configuration of an ultrasonic imaging apparatus according to a first embodiment of the present invention. This ultrasonic imaging apparatus is used as, for example, an ultrasonic diagnostic apparatus for diagnosis of human body or the like, or an inspection apparatus for industrial use.

As shown in FIG. 1, the ultrasonic imaging apparatus includes an ultrasonic probe 10, which is used by being abutted on an object to be inspected. The ultrasonic probe 10 is provided with a plurality of ($N^2$) ultrasonic transducers 10a, which is disposed in two-dimensional shape (N×N) to constitute a two-dimensional transducer array. Each ultrasonic transducer 10a generates ultrasonic waves in accordance with an inputted drive signal, and receives ultrasonic echoes, which are generated due to reflection from the object, to output a detection signal. As for the ultrasonic transducer 10a, for example, a piezoelectric element including a piezoelectric ceramic represented by PZT (Pb (lead) zirconate titanate) or a macromolecule piezoelectric element such as PVDF (polyvinylidene difluoride) as the material maybe used. In this embodiment, one ultrasonic transducer is used for both of transmission and reception of ultrasonic waves. However, different ultrasonic transducers for transmission and reception of ultrasonic waves may be provided.

Alternatively, the above-mentioned piezoelectric element may be used as a transmitting element of ultrasonic waves, and a photo-detection type transducer may be used as a receiving element of ultrasonic waves, so that the ultrasonic probe 10 is constituted by combining them. As for the photo-detection type transducer, an element, in which a Fabry-Perot resonator (referred to as FPR), Fiber Bragg grating or the like is formed at the front end of a minute optical fiber, may be used. Also, in this embodiment, a two-dimensional transducer array is used. However, in addition to that, a transducer array such as one-dimensional or 1.5-dimensional array may be used.

Further, the ultrasonic imaging apparatus includes an excitation timing controller 20, a plurality of pulser circuits 21 and a plurality of receivers 30.

The plurality of pulser circuits 21 and the plurality of receivers 30 are connected to the plurality of ultrasonic transducers 10a, respectively.

The excitation timing controller 20 supplies a plurality of excitation signals to the plurality of pulser circuits 21 at predetermined timings, respectively. In this embodiment, although the excitation timing controller 20 is constituted of an electronic circuit, it may be constituted of a pattern generator or the like.

The plurality of pulser circuits 21 outputs a plurality of drive signals to the ultrasonic probe 10 in accordance with the excitation signals supplied from the excitation timing controller 20. As for the pulser circuit, it is preferred to use a high-speed pulser circuit capable of outputting drive signals successively at high repetition periods (for example, 3 MHz to 10 MHz).

When the drive signals are supplied from the plurality of pulser circuits 21, the plurality of ultrasonic transducers 10a included in the ultrasonic probe 10 generates ultrasonic pulses in accordance with the drive signals output from the corresponding pulser circuits 12. By combining these ultrasonic pulses, transmitting beam (scanning line), which is biased in a desired direction, is formed.

The plurality of receivers 30 performs signal processing on electric signals (detection signals) which have been output from the corresponding ultrasonic transducers 10a. Each of the receivers 30 includes a preamplifier 31, a TGC (time gain compensation) amplifier 32 and an A/D converter 33. The detection signals, which have been output from the ultrasonic transducer 10a, are subjected to analog processing in the preamplifiers 31 and the TGC amplifiers 32 included in the corresponding receivers 30. Owing to this analog processing, the level of the detection signal is matched with the input signal level of the A/D converter 33. The analog signals output from the TGC amplifiers 32 are converted into digital signals (data) by the A/D converters 33, respectively.

Further, the ultrasonic imaging apparatus includes a system control unit 40, a memory 41, a phase matching calculating unit 42, a discontinuous region determining unit 43, a scan control unit 44, a display image calculating unit 45 and an image display unit 46. The system control unit 40 controls the respective units of the ultrasonic imaging apparatus.

The memory 41 includes a plurality of lines corresponding to the plurality of receivers 30, and stores detection data, which is output from each receiver 30, in chronological order.

The phase matching calculating unit 42 performs calculation processing for matching the phases of the detection signals represented by the detection data with each other. That is to say, the phase matching calculating unit 42 carries out reception focus processing in which desired delays are given to the pieces of detection data stored in the memory 41 and the pieces of resultant detection data are added to each other, thereby a piece of sound ray data, which represent ultrasonic information along a desired scanning line, is generated. The phase matching calculating unit 42 is constituted of a shift register delay line, a digital minute delay device, CPU (central processing unit) and software, or a combination thereof.

On the basis of the sound ray data generated by the phase matching calculating unit 42, the discontinuous region determining unit 43 detects a boundary of medium residing within the object and determines continuity of the boundary of medium in the neighboring plurality of regions to detect a region where the boundary of medium is discontinuous.

On the basis of a determination result of the discontinuous region determining unit 43, the scan control unit 44 sets up scanning region within the object and scanning line density.

The display image calculating unit 45 demodulates the detection waveform with respect to the sound ray data, which is output from the phase matching calculating unit 42, and performs a predetermined image processing to output image data. Further, the display image calculating unit 45 converts the scanning format with respect to the image data, which has been subjected to image processing, to convert the image data in the scanning space of the ultrasonic beam into the image data in physical space. In the case of displaying three-dimensional image, before converting the scanning format, a processing may be carried out so that voxel data, which are the data about a volume, are generated from a plurality of sheets of tomographic data.

The image display unit 46 converts the image data, of which scanning format has been converted by the display image calculating unit 45, into analog signals by D/A conversion, and displays ultrasonic image on the basis of these signals.

Next, an ultrasonic imaging method according to the first embodiment of the present invention will be described with reference to FIGS. 1–8.

Figure 2:
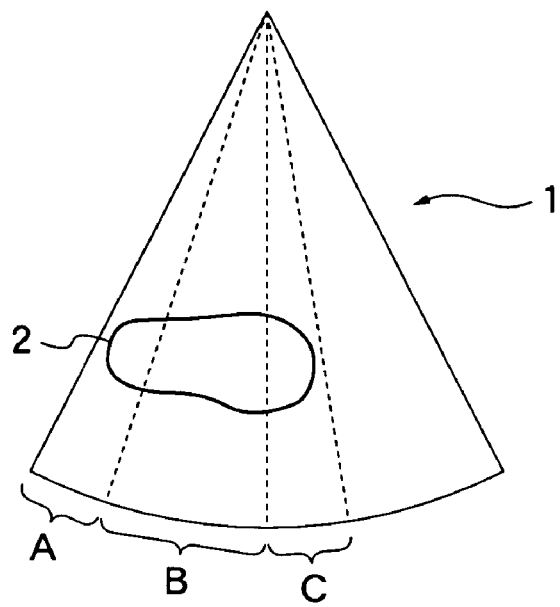
FIG. 2 is a diagram showing a sector region to be scanned within an object to be inspected.

The ultrasonic imaging method according to this embodiment is a method of scanning an object while changing the scanning line density in an adaptive manner on the basis of the continuity of the boundary of medium residing within the object. Here, in general, when comprehending the shape and dimension of a reflection source in the ultrasonic diagnosis, a region where the outline of the reflection source changes discontinuously is more critical than a region where it changes continuously. For example, as shown in FIG. 2, in the case where a reflection source 2 resides in a sector region 1, a lot of critical information is included in a region A or a region C where positional information about the reflection is discontinuously or changes sharply, rather than in a region B where the positional information changes gently. Accordingly, in the ultrasonic imaging method according to this embodiment, the ultrasonic information is obtained by scanning roughly with a low density of the scanning lines in a region where the positional information about the reflection source changes continuously, and scanning finely with a high density of the scanning lines in a region where the positional information changes discontinuously.

Figure 3:
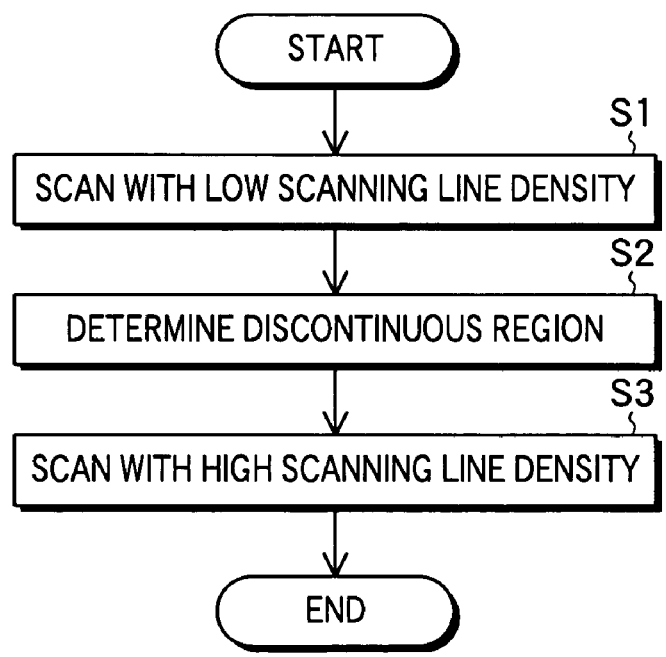
FIG. 3 is a flowchart showing the ultrasonic imaging method according to the first embodiment of the present invention.

FIG. 3 is a flowchart showing the ultrasonic imaging method according to this embodiment.

Figure 4:
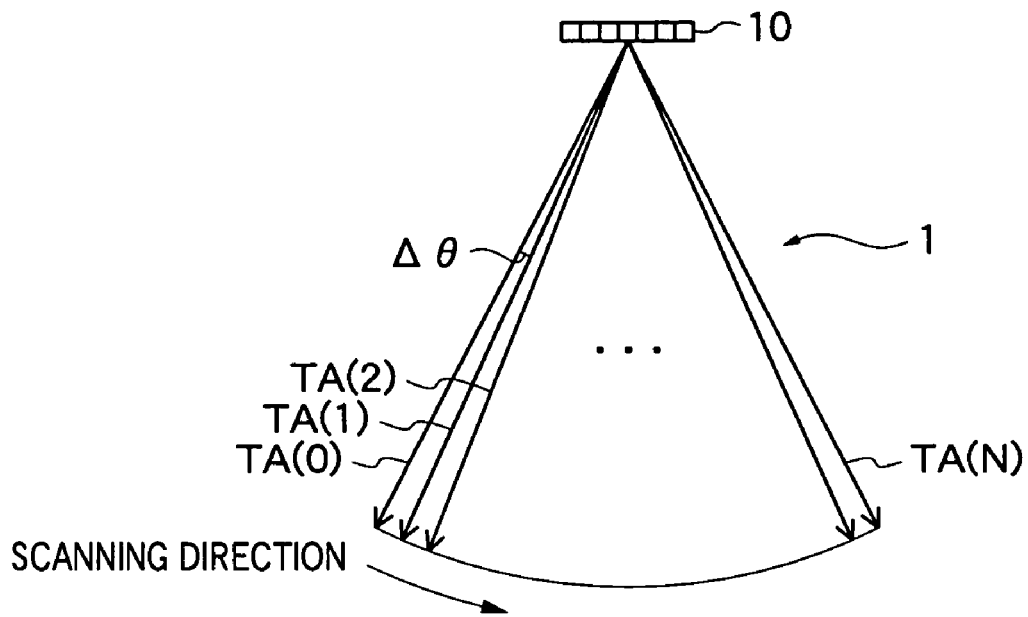
FIG. 4 is a diagram showing a scanning line density in an ordinary scanning.
Figure 5:
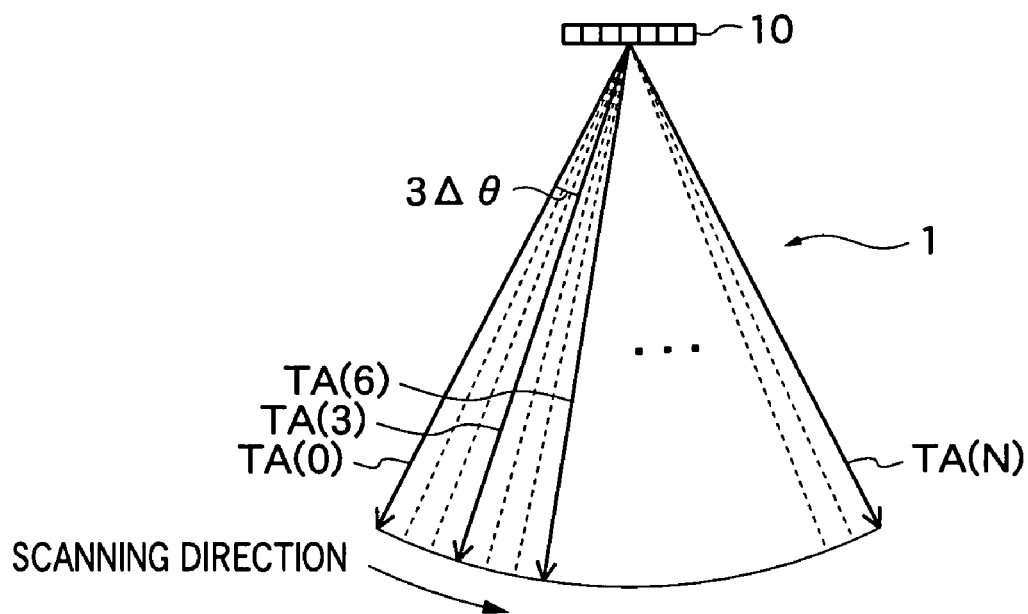
FIG. 5 is a diagram showing a scanning with a low scanning line density, which is carried out in the ultrasonic imaging method according to the first embodiment of the present invention.

First, at step S1, the ultrasonic imaging apparatus scans scanning regions within the object with a low scanning line density. That is, when scanning a sector region 1 to be scanned, ordinarily the scanning is carried out at $\Delta\theta$ intervals between the scanning lines as shown in FIG. 4. However, in this embodiment, the scanning is carried out, for example, at $3\times\Delta\theta$ intervals between the scanning lines as shown in FIG. 5. In order to achieve the above, under the control of the scan control unit 44, excitation signals are supplied from the excitation timing controller 20 to the plurality of pulser circuits 21. Responding to the excitation signals, each pulser circuit 21 outputs a drive signal to the corresponding ultrasonic transducer 10a on the basis of the supplied excitation signal. Owing to this, ultrasonic beam is transmitted sequentially at $3\times\Delta\theta$ intervals.

Also, the plurality of ultrasonic transducers 10a receive ultrasonic echoes, which have been generated by the reflection of transmitted ultrasonic beam from the reflection source, and output detection signals. After being subjected to the signal processing, these detection signals are converted into digital data in the corresponding receiver 30, and stored in the memory 44 in chronological orders. Further, by using the detection data stored in the memory 44, the phase matching calculating unit 42 performs the reception focus processing corresponding to the transmitting direction of the ultrasonic beam. Owing to this, pieces of sound ray data, which represent the ultrasonic information along the respective scanning lines, are generated.

As described above, the transmitting/receiving of the ultrasonic beam at step Si as shown in FIG. 3 is sequentially carried out while changing the transmitting direction, thereby the entire range of the sector region 1 is roughly scanned.

Then, at step S2, on the basis of the pieces of sound ray data which are obtained by scanning the sector region 1 with low scanning line density, the discontinuous region determining unit 43 determines whether or not any region of discontinuous boundary resides as to the boundary of medium found in the sector region 1.

Figure 6:
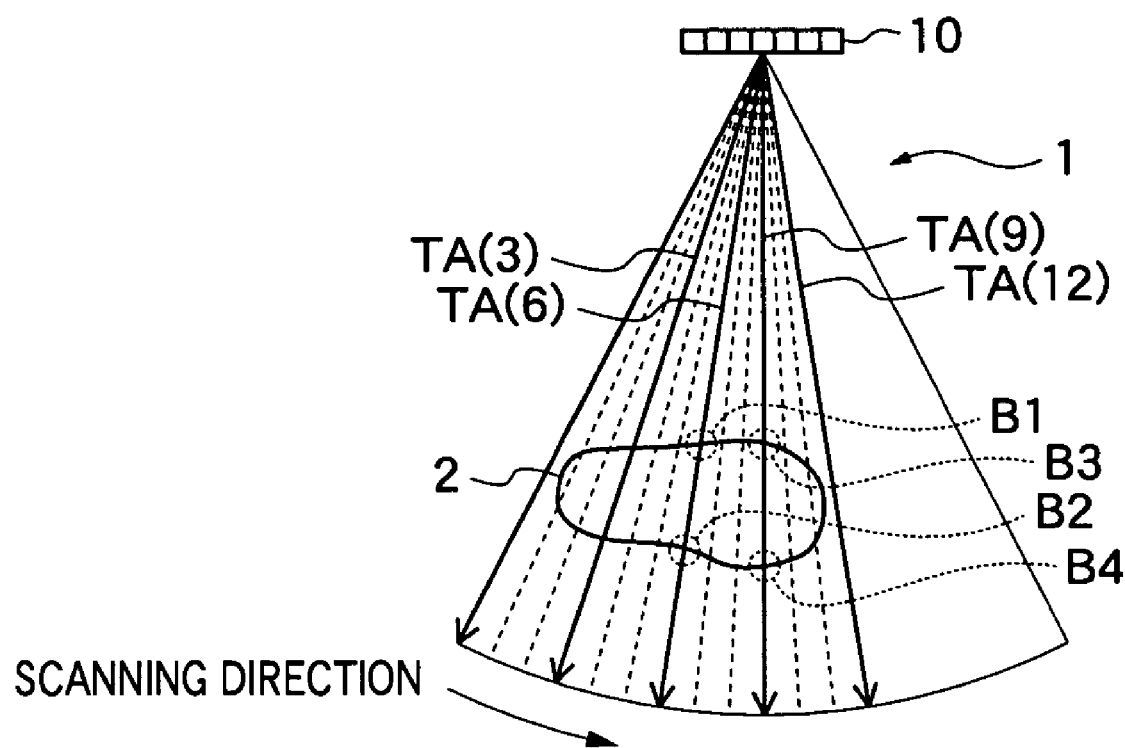
FIG. 6 is a diagram for illustrating a method of determining the continuity of boundary.
Figure 7:
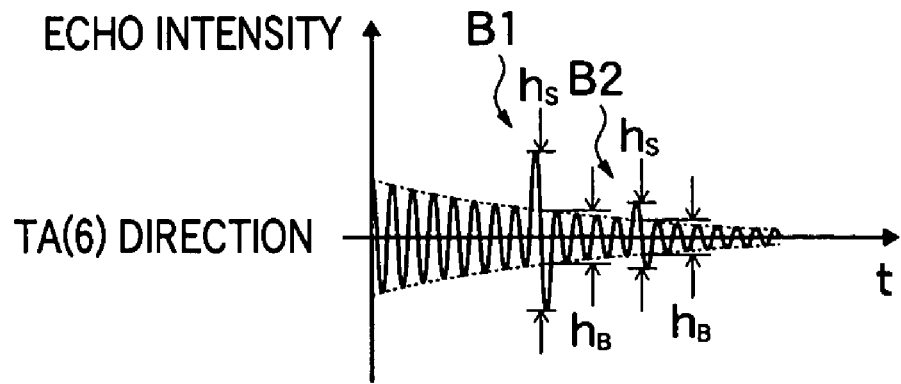
FIG. 7 is a diagram for illustrating a method of determining whether or not the boundary resides on the scanning line.
Figure 7:
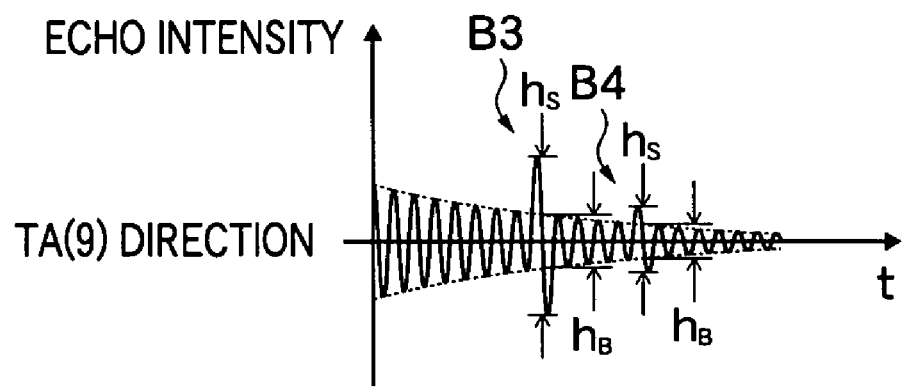
Figure 7:
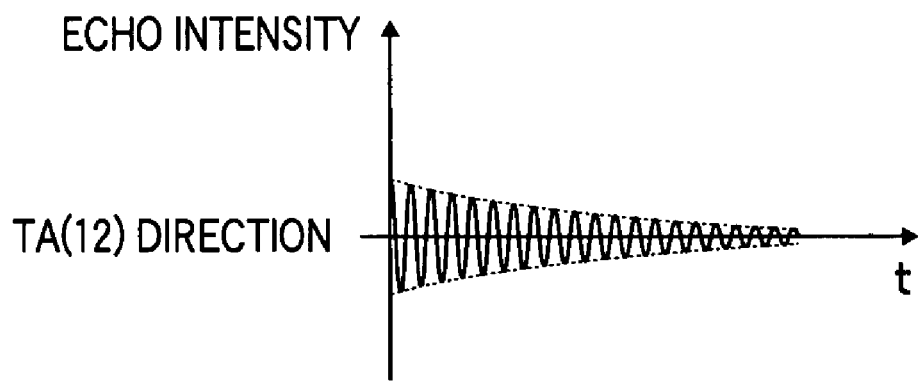
Figure 8:
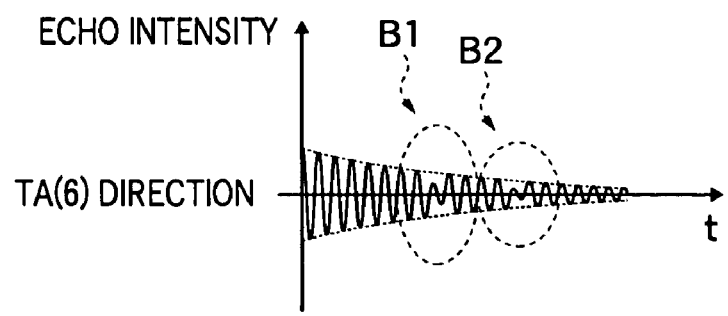
FIG. 8 is a diagram for illustrating a method of determining whether or not the boundary resides on the scanning line.

Here, a method of determining the region of discontinuous boundary will be described with reference to FIGS. 6–9. As shown in FIG. 6, in the case where a reflection source 2 resides in the sector region 1, an ultrasonic beam, which is transmitted in a direction of the scanning line, for example, TA(6), is reflected at boundaries B1 and B2. In this case, the intensity of the echo signals from these reflection regions becomes higher than that from the surrounding regions. Accordingly, as shown in FIG. 7, on the envelope of the RF signal representing ultrasonic information with respect to scanning line TA(6), projections, which represent ultrasonic echoes generated at the boundaries B1 and B2, are found. Also, on the envelope of the RF signal representing ultrasonic information with respect to the scanning line TA(9), projections, which represent ultrasonic echoes generated at the boundaries B3 and B4, are found. Alternatively, in the case where the ultrasonic echoes are reflected from an edema or the like, the intensity of the echo signals from the reflection regions becomes lower than that in the surrounding regions. In such case, as shown in FIG. 8, the signals representing the boundaries B1 and B2 become low echoes (also, referred to as anti-echoes). In FIGS. 7 and 8, the abscissa axis "t" of the graph represents the detection time of the ultrasonic echo signal. The larger value of "t" represents an ultrasonic echo generated at the deeper portion of the object. The ordinate axis of the graph represents the intensity of the ultrasonic echo signal.

Now, the discontinuous region determining unit 43 determines whether or not any boundary of medium resides within the object as to the scanning line as determination target. That is, as shown in FIG. 7, when a certain increase or decrease is found at a time point in the amplitude $h_s$ of an ultrasonic echo signal relative to the amplitude $h_B$ of the prior or following signal, the discontinuous region determining unit 43 determines that a boundary of medium resides in a position corresponding to the time point. For example, when the following expression (1) is satisfied, the discontinuous region determining unit 43 determines that the boundary of medium resides.

$$|(h_s-h_B)/h_B|>0.1 \qquad (1)$$

In the expression (1), the threshold value is set to 0.1. This value is set up on the basis of the width or the like of the envelope.

Figure 9:
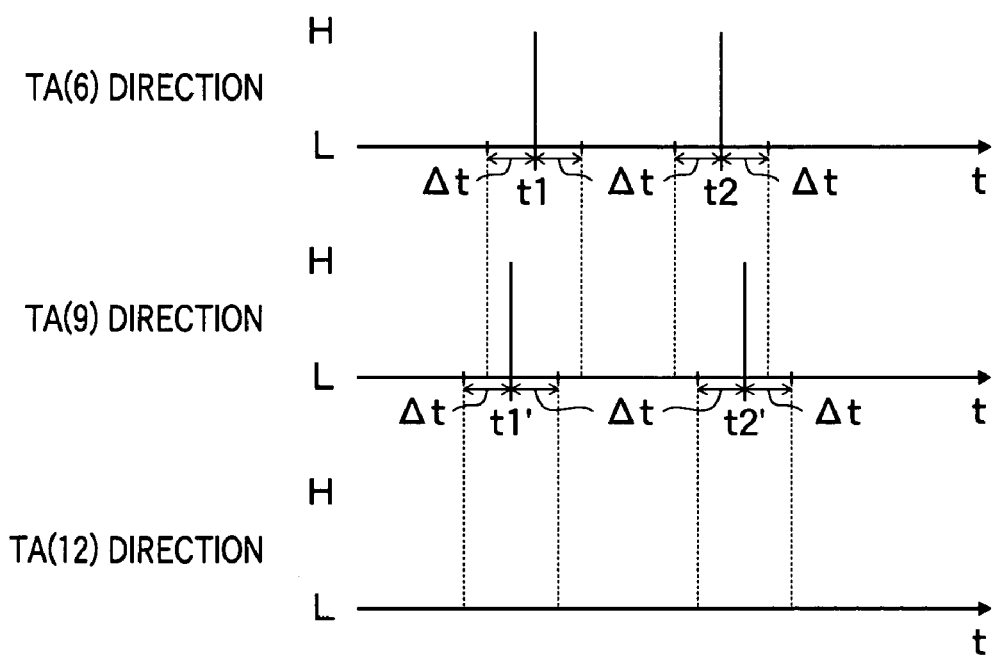
FIG. 9 is a diagram for illustrating a method of determining whether or not the boundary residing in on a neighboring scanning line is continuous.

Then, the discontinuous region determining unit 43 compares the sound ray data as to the neighboring scanning lines and determines whether or not the boundary of medium, which is found on the both scanning lines, is continuous. The determination is carried out as described below. As shown in FIG. 9, with respect to the scanning line TA (6), the discontinuous region determining unit 43 detects the position (depth) where the signal, which represents the existence of the boundary, becomes high. In FIG. 9, the position (depth) corresponds to each of time points t1 and t2 in sequence of the detection signal. Then, on the scanning line TA (9) neighboring to the scanning line TA (6), the discontinuous region determining unit 43 sets up a range (a predetermined period) where the boundary may reside. The range where the boundary resides is a range within ±Δt with reference to the each of the time points t1 and t2 of the boundary. When a high level signal is found within the range of t1±Δt and t2±Δt as to the scanning line TA (9), the boundary is determined as continuous. If not found, the boundary is determined as discontinuous. Likewise, with respect to the scanning line TA (12), the continuity of boundary is also determined on the basis of the time points t1' and t2' at which the high level signal appears as to the scanning line TA (9). As a result, in the case as shown in FIG. 9, it is determined that the boundary on the scanning line TA (6) and scanning line TA (9) is continuous, while the boundary on the scanning line TA (9) and scanning line TA (12) is discontinuous.

Figure 10:
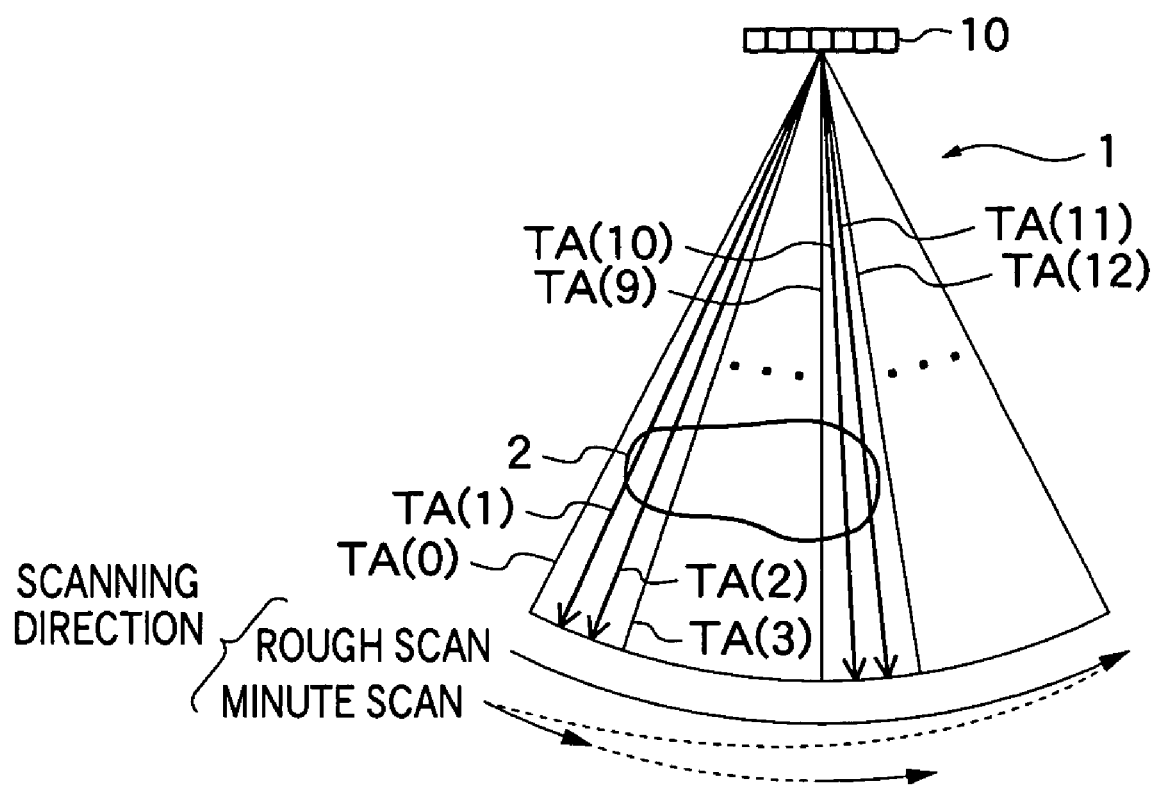
FIG. 10 is a diagram showing a scanning with a high scanning line density carried out in the ultrasonic imaging method according to the first embodiment of the present invention.

Referring to FIG. 3 again, at step S3, the ultrasonic imaging apparatus further performs the scanning with high density scanning lines on the region between the scanning line TA (0) and the scanning line TA (3), and the region between the scanning line TA (9) and the scanning line TA (12) where the boundary is discontinuous. Owing to this, as shown in FIG. 10, the ultrasonic beam is further transmitted and received in the direction of scanning line TA (1), TA (2), TA (10) and TA (11), and sound ray data about each scanning line are obtained.

In this embodiment, the entire scanning region is scanned roughly first. And then, the regions where the boundary is discontinuous are scanned finely so as to interpolate them. As described above, the scanning line density is changed adaptively on the basis of the continuity in the detected boundary, thereby it is made possible to effectively obtain ultrasonic information about the entire range at a high speed while obtaining detailed ultrasonic information about the critical regions. In addition, since the entire scanning region is roughly scanned first, the outline of the imaging object can be comprehended in early stage.

Figure 11:
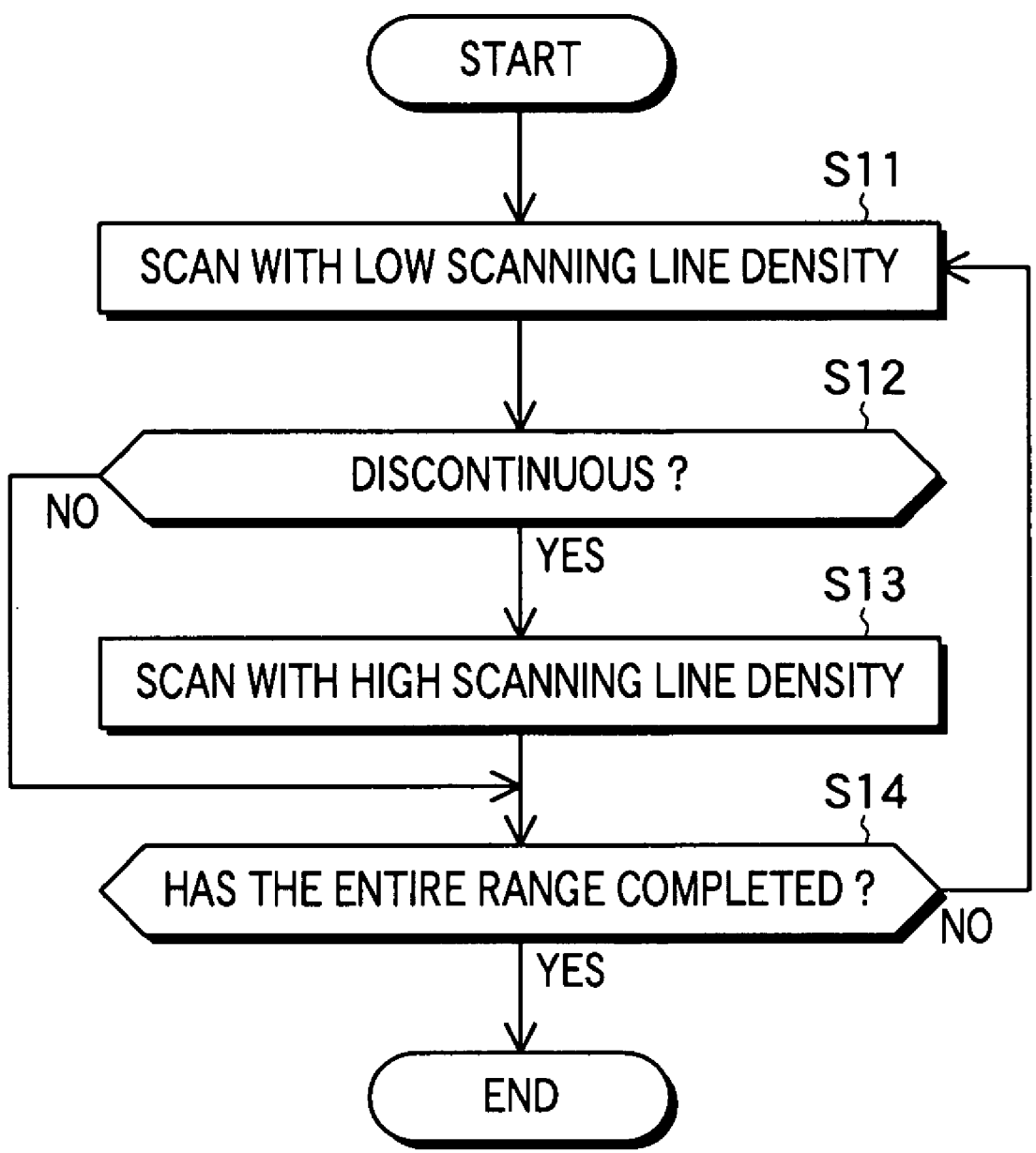
FIG. 11 is a flowchart showing the ultrasonic imaging method according to a second embodiment of the present invention.

Next, an ultrasonic imaging method according to a second embodiment of the present invention will be described with reference to FIGS. 11 and 12. The ultrasonic imaging method according to this embodiment may be used in the ultrasonic imaging apparatus as shown in FIG. 1. FIG. 11 is a flowchart showing the ultrasonic imaging method according to this embodiment.

Figure 12:
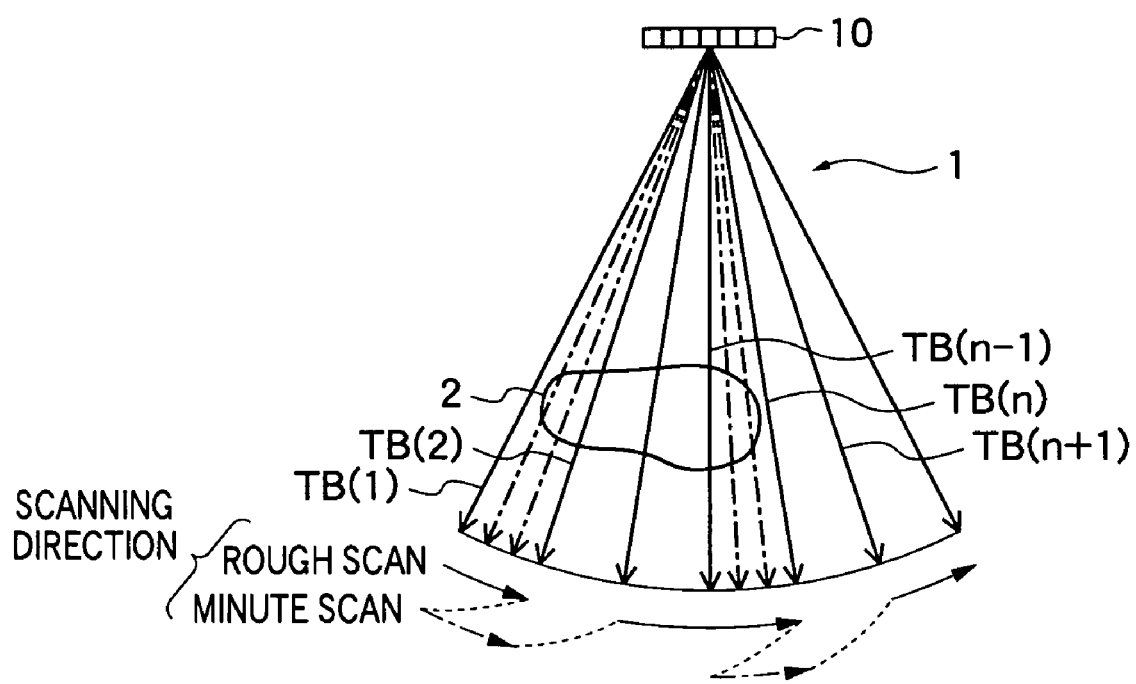
FIG. 12 is a diagram for illustrating a scanning carried out in the ultrasonic imaging method according to the second embodiment of the present invention.

At step S11, the ultrasonic imaging apparatus starts scanning with a low scanning line density on the sector region 1 as shown in FIG. 12. Owing to this, sound ray data with respect to a plurality of scanning lines TB (1) and TB (2), . . . are generated in order.

Then, at step S12, the discontinuous region determining unit 43 compares the sound ray data with respect to the scanning line TB (n) which is newly obtained at step S11, with the sound ray data with respect to the scanning line TB (n−1) which has been obtained before step S11. When any boundary of medium is found as to either one of the two neighboring scanning lines, the discontinuous region determining unit 43 determines whether or not these boundaries are discontinuous. The method of determining the region of discontinuous boundary is the same as that described with reference to FIGS. 7–10.

At step S12, when the boundary is not found, or when the found boundary is not discontinuous, the ultrasonic imaging apparatus returns to step S11, and scans again the sector region 1 with the low scanning line density (step S14).

On the other hand, when the found boundary is discontinuous, at step S13, the ultrasonic imaging apparatus performs scanning with the high scanning line density on the region between the scanning line TB (n) and the scanning line TB(n−1).

When the scanning with the high scanning line density on this region has completed, the ultrasonic imaging processing returns to step S11, and scans the sector region 1 again with the low scanning line density. In the case of returning to step S11, the scanning starts from a scanning line TB(n+1) which neighbors the scanning line TB(n). When the scanning of the entire range of the sector region 1 has been completed, the operation is terminated (step S14).

In this embodiment, as shown in FIG. 12, the sector region 1 is roughly scanned, and every time when a region where the boundary of medium is discontinuous is detected, the region is scanned with the high scanning line density. Accordingly, the entire scanning region can be sequentially scanned at a high speed from one side to the other side in order while obtaining detailed ultrasonic information about the critical region.

In the above-described first and second embodiments, the case where a two-dimensional sector region is scanned has been described. However, in the case of scanning of another two-dimensional region, or a three-dimensional region, the entire of a scanning region can be scanned at a high speed as the same as those embodiments, by determining a region of discontinuous boundary on the basis of obtained sound ray data and carrying out the scanning while changing adaptively the scanning line density on the basis of the determination result.

Figure 13:
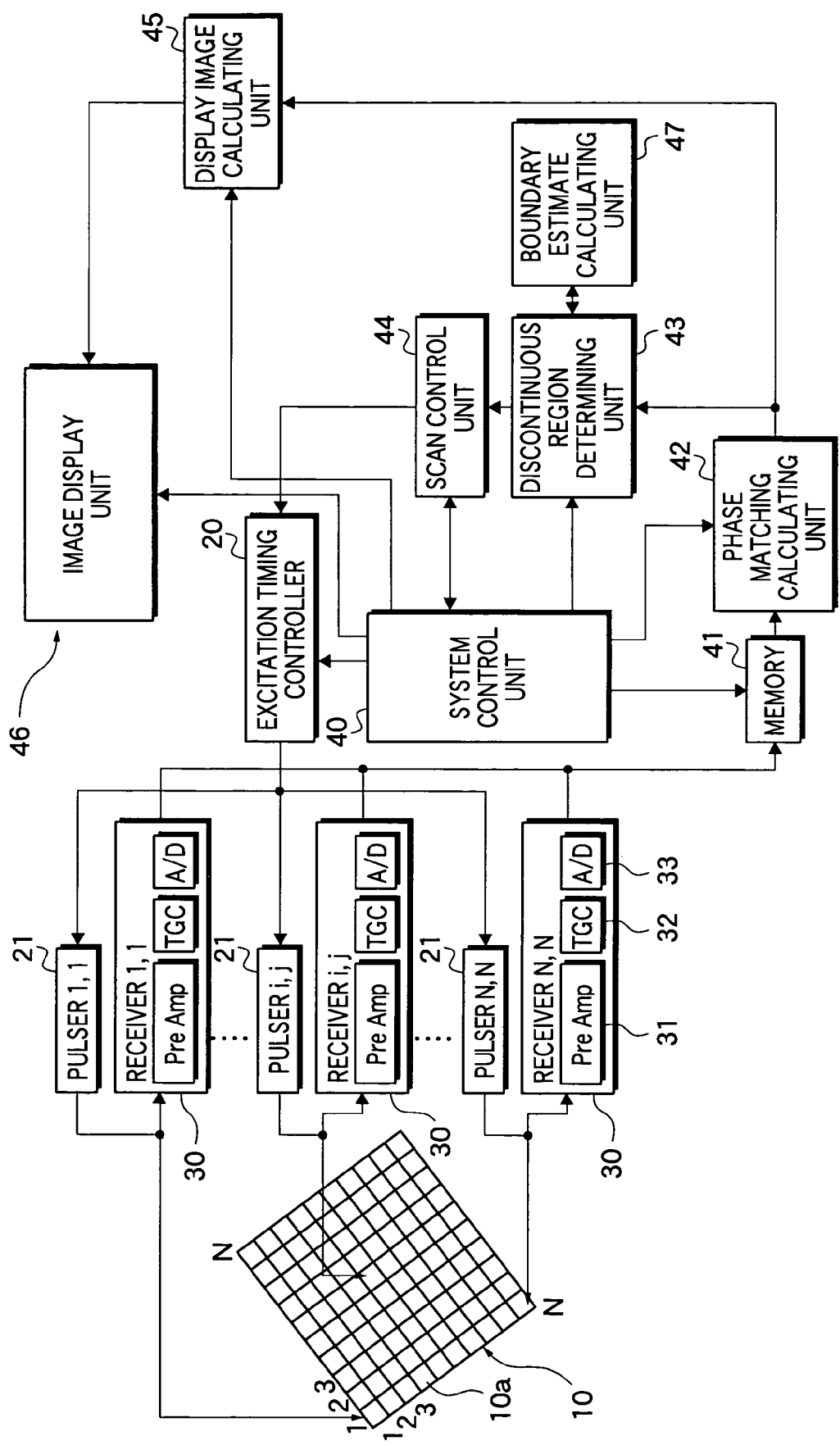
FIG. 13 is a block diagram showing the configuration of an ultrasonic imaging apparatus according to a third embodiment of the present invention.

Next, an ultrasonic imaging apparatus according to a third embodiment of the present invention will be described. FIG. 13 is a block diagram showing the configuration of an ultrasonic imaging apparatus according to this embodiment. In this ultrasonic imaging apparatus, a boundary estimate calculating unit 47 is added to the ultrasonic imaging apparatus as shown in FIG. 1. The configuration excluding the above is the same as that of the ultrasonic imaging apparatus as shown in FIG. 1.

The boundary estimate calculating unit 47 performs a calculation for estimating the position of the boundary in the next scanning region on the basis of the boundary position of the medium which has been detected by the discontinuous region determining unit 43.

An ultrasonic imaging method according to this embodiment will be described. Same as the ultrasonic imaging method according to the first or second embodiment of the present invention, the ultrasonic imaging method according to this embodiment comprises the step of scanning the scanning regions within the object with a low scanning line density and the step of scanning the region of discontinuous boundary of medium, which is detected by the first scanning, with a high scanning line density. When detecting the region of discontinuous boundary, this embodiment is characterized by using the region where existence of the boundary has been estimated by the boundary estimate calculating unit 47.

Figure 14:
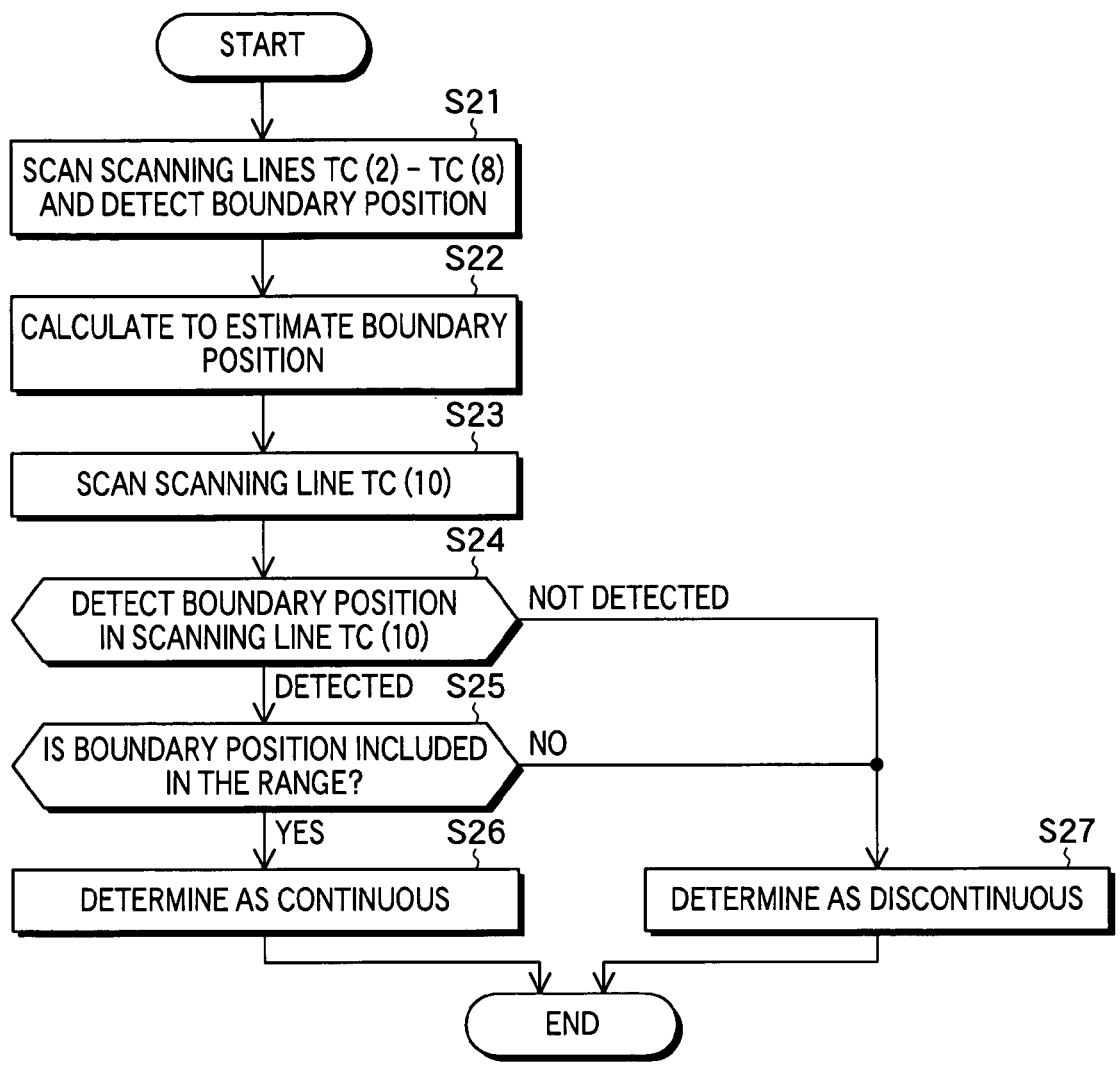
FIG. 14 is a flowchart showing a method of detecting a region of discontinuous boundary in the ultrasonic imaging method according to the third embodiment of the present invention.
Figure 15:
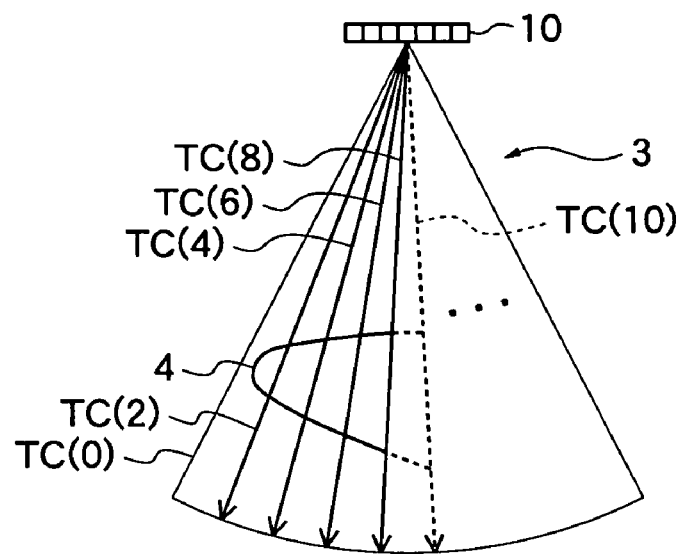
FIG. 15 is a diagram showing a region scanned in the ultrasonic imaging method according to the third embodiment of the present invention.

FIG. 14 is a flowchart showing a method of detecting the region of discontinuous boundary in the ultrasonic imaging method according to this embodiment. Further, FIG. 15 is a diagram showing a sector region which is scanned in this embodiment.

Figure 16:
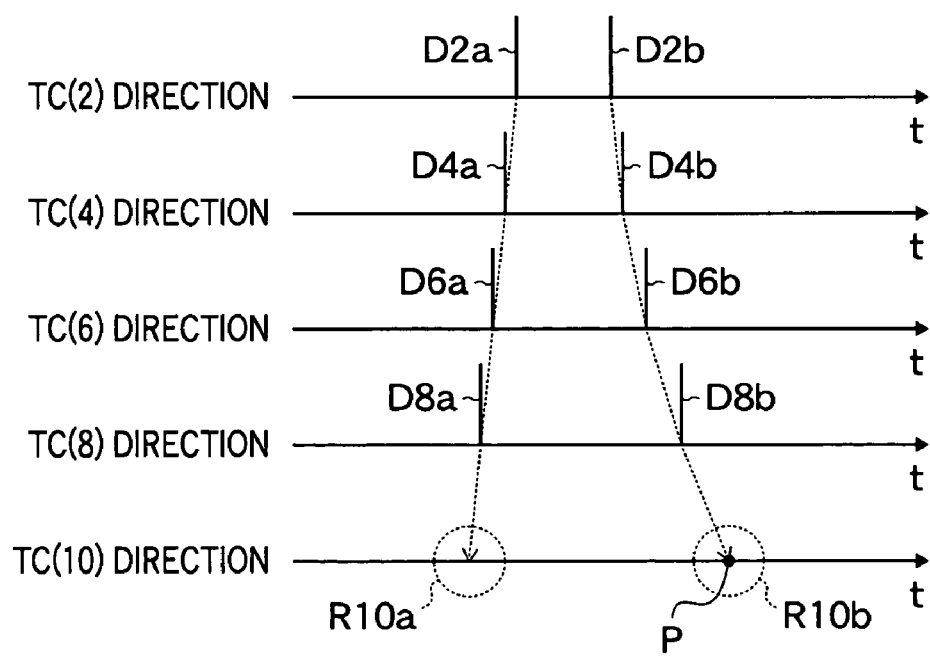
FIG. 16 is a diagram for illustrating an estimating method of a boundary position.

In FIG. 14, at step S21, the ultrasonic imaging apparatus scans sector region 3, where a reflection source 4 resides, to obtain sound ray data about the scanning lines TC (0), TC (2), . . . , and TC(8). On the basis of these sound ray data, the discontinuous region determining unit 43 detects each boundary position on the scanning lines TC(0), TC(2), . . . , and TC(8). The detecting method of the boundary position is the same as that in the first embodiment of the present invention, which has been described with reference to FIGS. 7 and 8. Owing to this, signals D2a and D2b, D4a and D4b, D6a and D6b, D8a and D8b, which indicate the existence of the boundary, are obtained as shown in FIG. 16.

Then, at step S22, on the basis of the signals indicating the existence of the boundary on the scanning lines TC(2) to TC(8) in which the boundary has been detected, the boundary estimate calculating unit 47 performs a calculation for estimating the range of the boundary position on the scanning line TC(10). That is, by using a series of signals D2a, D4a, D6a and D8a, and signals D2b, D4b, D6b and D8b, ranges R10a and R10b, where the boundaries may reside on the scanning line TC(10), are obtained respectively.

Figure 17:
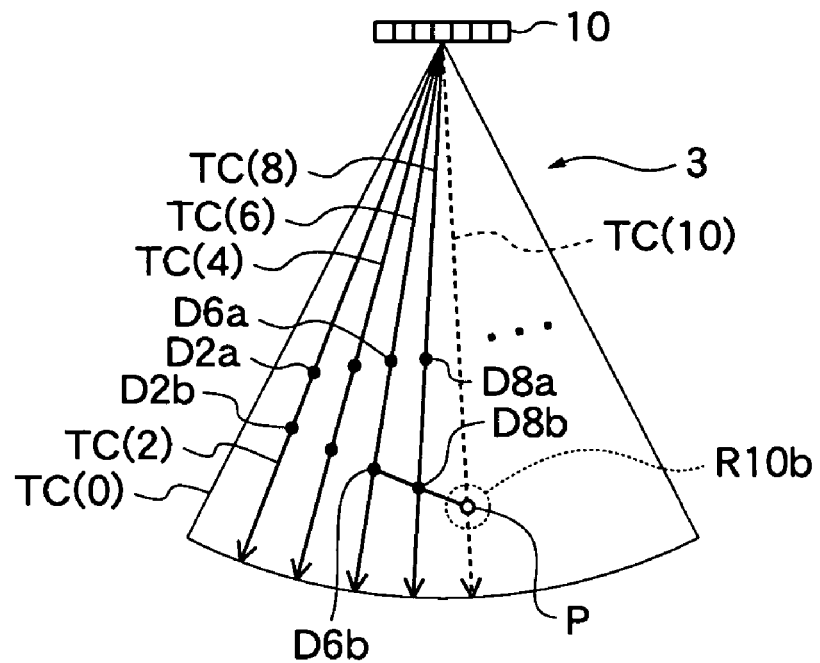
FIG. 17 is a diagram for illustrating an estimating method of the boundary position.

The position of the boundary can be estimated by performing, for example, the following calculation. First, as shown in FIG. 17, signals representing the existence of the boundary, which are obtained at step S21 (FIG. 16), are converted onto a sector image to plot points corresponding to the signals D2a–D8b. Then, the point D8b, which has been obtained by the latest scan, is connected with a straight line to the point D6b, which has been obtained by the scan prior thereto, to obtain an intersecting point P between the extension thereof and the scanning line TC(10). Then, a circle having a predetermined radius is drawn around the intersecting point P. As for the value of the radius, for example, a maximum value of the deviation between an estimated value and an actual boundary position in the past is used. In FIG. 16, the range corresponding to this circle is defined as the range R10b where the boundary resides on the scanning line TC (10). The range R10a, where the boundary may reside, is also obtained by using the points D6a and D8a in the same manner as described above.

Figure 18:
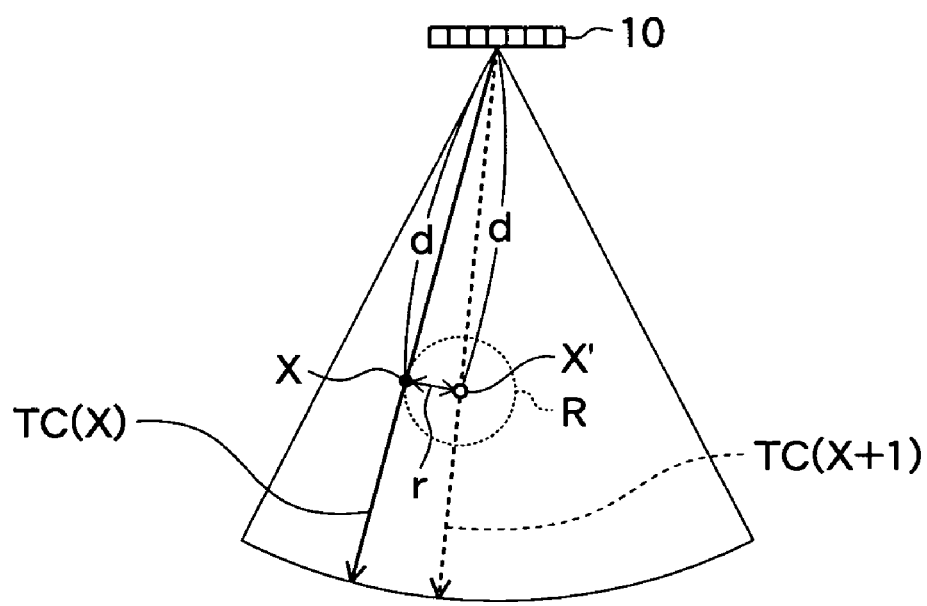
FIG. 18 is a diagram for illustrating an estimating method of the boundary position.

In the case where a boundary is newly detected (for example, points D2a and D2b on the scanning line TC(2) in FIG. 17) when performing the scanning along a scanning line, the range where the boundary may reside is calculated as described below. As shown in FIG. 18, in the case where a boundary is newly detected at a position "X" on a scanning line TC(X), it is assumed that the boundary position X' in the neighboring scanning line TC(X+1) resides at a depth "d" same as that of the position X. Then, a circle which goes through the position X around the position X' as a center, i.e., which has a radius corresponding to a distance "r" between X and X' is drawn. The circle is defined as the range R where the boundary may reside on the neighboring scanning line TC(X+1).

As for the calculation processing at step S22, in addition to the above, various generally known position-estimating calculation methods may be used.

Referring to FIG. 14 again, at step S23, the ultrasonic imaging apparatus performs the scanning along the scanning line TC (10) to obtain the sound ray data.

Then, at step S24, on the basis of the sound ray data obtained at step S23, the discontinuous region determining unit 43 detects the position of the boundary on the scanning line TC(10). The detecting method of the position of the boundary is the same as that at step S21.

Then, at step S25, the discontinuous region determining unit 43 determines whether or not the signal representing the position of the boundary on the scanning line TC(10), which has been obtained at step S24, is included in the range R10a or R10b of the estimated boundary obtained at step S22. In the case where the signal representing the position of the boundary is included in the range R10a or R10b, it is determined that the boundary between the scanning line TC(8) and the scanning line TC(10) is continuous. On the other hand, in the case where the signal representing the position of the boundary is not included in the range R10a or R10b, it is determined that the above boundary is discontinuous. Also, at step S24, in the case where the boundary has not been detected on the scanning line TC(10), it is determined that the above boundary is discontinuous.

Referring to FIG. 13 again, the ultrasonic imaging apparatus performs the scanning with a high scanning line density on the region of discontinuous boundary which is determined as described above. As for the scanning method, as shown in FIG. 10, a method may be used in which the entire range of the sector region 3 is roughly scanned first and then the region determined as discontinuous is scanned minutely. Alternately, as shown in FIG. 12, a method may be used in which, every time when the region is determined as discontinuous while roughly scanning the sector region 3, the scan returns to that region to carry out minute scanning.

According to this embodiment, on the basis of the positional information of a previously detected boundary, the boundary position on the next scanning line is estimated and compared with an actually measured value. Accordingly, the continuity of boundary can be determined more correctly.

In this embodiment, on the basis of the information of the boundary position which is obtained by the latest scanning and the information of the boundary position which has been obtained by the scanning prior thereto by one, the boundary position in the next scanning line is estimated. However, the information of the boundary position may be used which had obtained further previously.

Next, an ultrasonic imaging apparatus according to a fourth embodiment of the present invention will be described. The ultrasonic imaging method according to this embodiment is a multi-beam system. That is, by transmitting a plurality of ultrasonic beams in a plurality of directions at the same time, three-dimensional region of an object is scanned at a high speed.

In the multi-beam system, the cross talk becomes a problem in a case such that, when receiving one ultrasonic echo, which is generated by a first ultrasonic beam transmitted in one direction and reflected by a reflection source, another ultrasonic echo, which is generated by a second ultrasonic beam transmitted in another direction and reflected by the reflection source, is received simultaneously. Therefore, before carrying out an actual ultrasonic imaging with the multi-beam system, a pre-imaging is made to comprehend the outline of the object as to whether or not any reflection source resides which may cause the cross talk. Since the pre-imaging has to be made with a single beam in order to avoid the influence of the cross talk, it takes a long time for imaging. Accordingly, in this embodiment, a method of carrying out the pre-imaging at a high speed is adopted.

Figure 19:
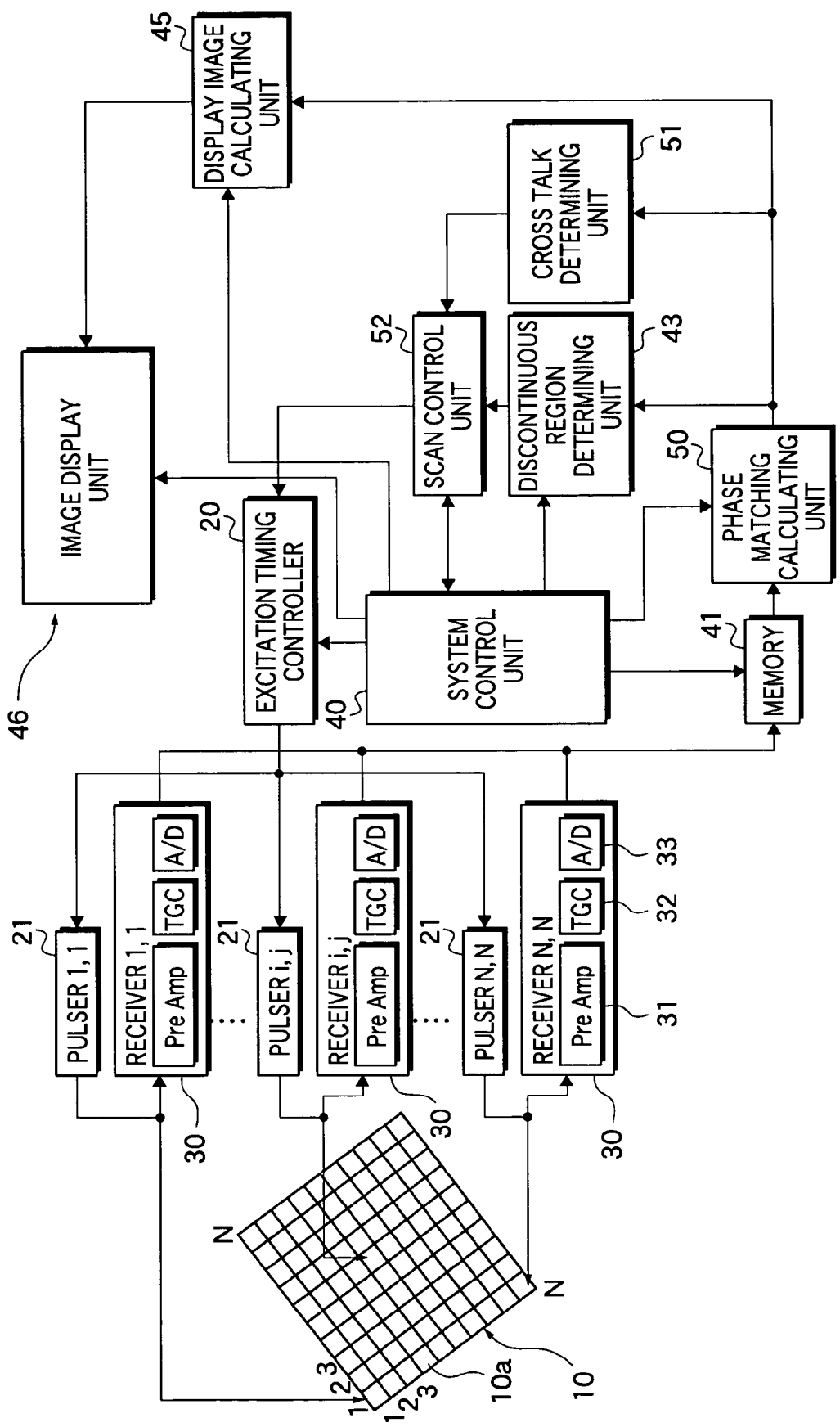
FIG. 19 is a block diagram showing the configuration of an ultrasonic imaging apparatus according to a fourth embodiment of the present invention.

FIG. 19 is a block diagram showing a configuration of an ultrasonic imaging apparatus according to this embodiment. This ultrasonic imaging apparatus has a phase matching calculating unit 50 and a scan control unit 52 in place of the phase matching calculating unit 42 and the scan control unit 44 in the ultrasonic imaging apparatus as shown in FIG. 1, and further has a cross talk determining unit 51. The configuration other than the above is the same as that of the ultrasonic imaging apparatus as shown in FIG. 1.

The phase matching calculating unit 50 performs calculation processing to match the phases of the pieces of detection data stored in the memory 41 with each other. The phase matching calculating unit 50 is provided with a plurality of channels corresponding to the number of the transmission beams. Each channel of the phase matching calculating unit 50 provides designated delays to a series of detection data, which are obtained on the basis of the detection signals output from ultrasonic transducers 10a, and digitally adds them to each other. Thus, by using the phase matching calculating unit 50 having a plurality of channels, the reception focusing relative to a plurality of directions within the object can be achieved simultaneously.

When a pre-imaging is carried out by pre-scanning the object, the cross talk determining unit 51 determines whether or not a reflection source, which may cause the cross-talk, resides on the basis of the image information obtained as a result.

Further, the scan control unit 52 sets up the scanning line density and the scanning region on the basis of the determination result of the discontinuous region determining unit 43 when carrying out the pre-scan, and in the actual imaging, the scanning conditions including transmission timing and transmitting directions of the ultrasonic waves to be transmitted on the basis of the determination result of the cross talk determining unit 51.

Figure 20:
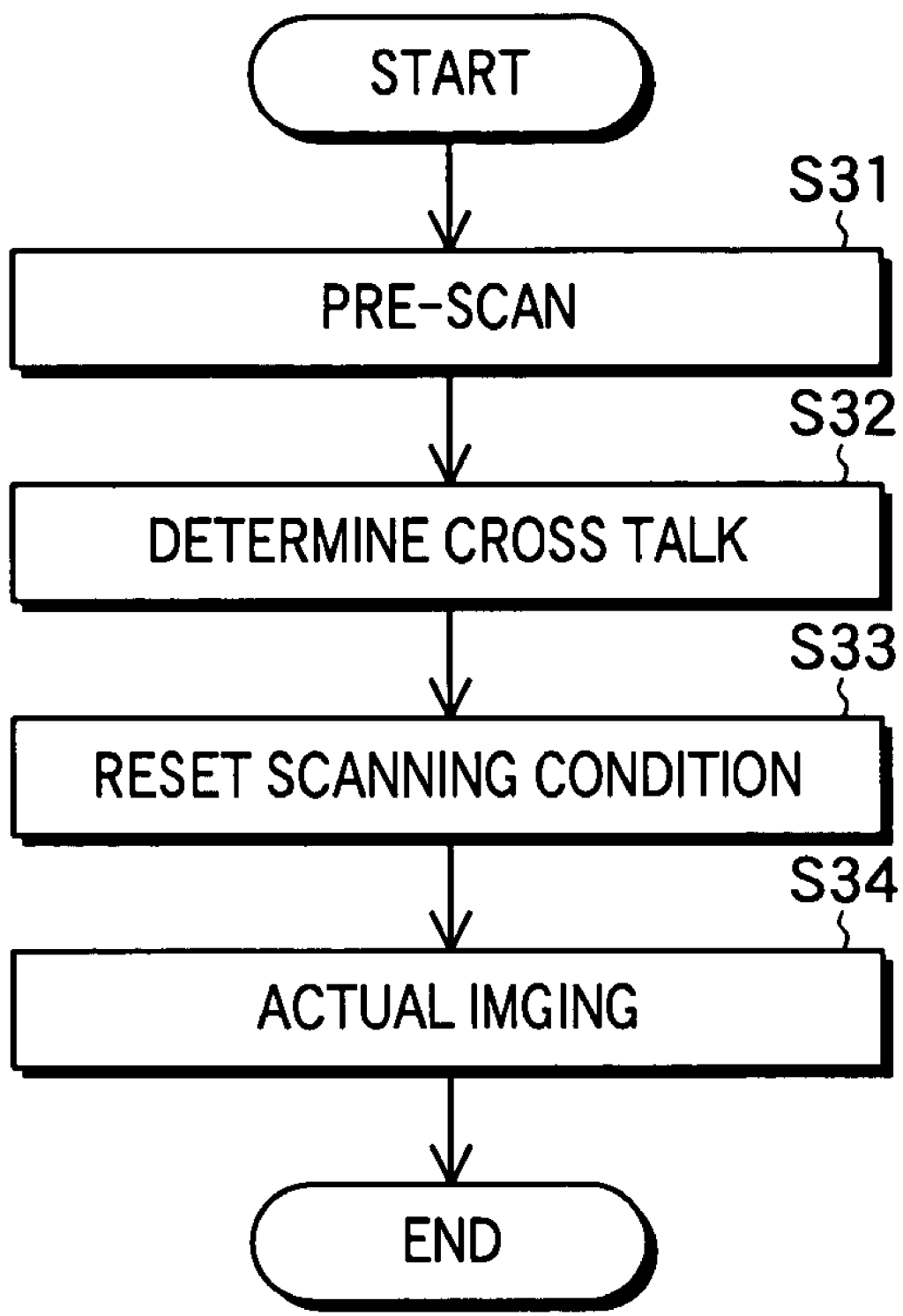
FIG. 20 is a flowchart showing the ultrasonic imaging method according to the fourth embodiment of the present invention.

Next, an ultrasonic imaging method according to the fourth embodiment of the present invention will be described with reference to FIGS. 19–22C. FIG. 20 is a flowchart showing the ultrasonic imaging method according to this embodiment. FIGS. 21A–22C are diagrams for illustrating an ultrasonic imaging method according to this embodiment.

Figure 21A:
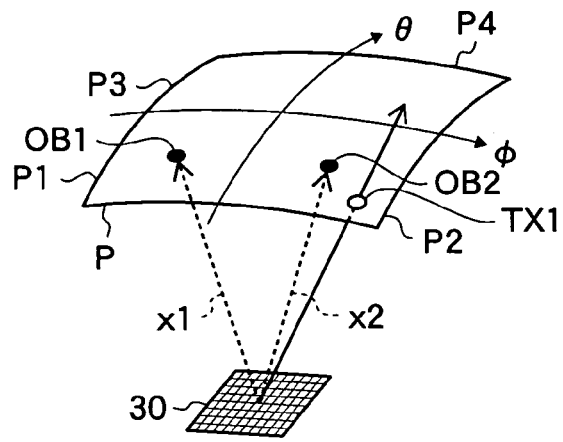
FIGS. 21A–21C are diagrams for illustrating the ultrasonic imaging method according to the fourth embodiment of the present invention.
Figure 21B:
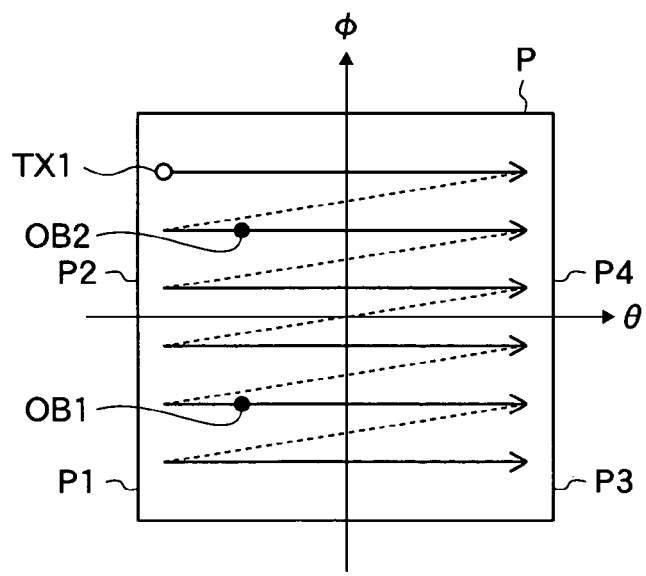
Figure 21C:
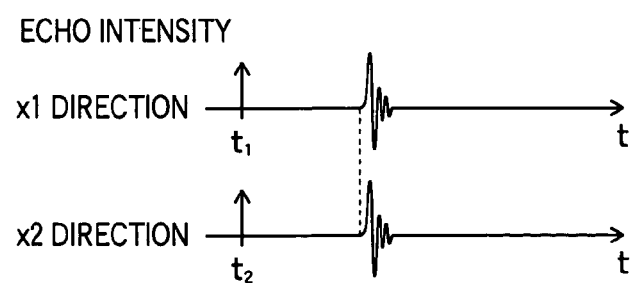
Figure 22A:
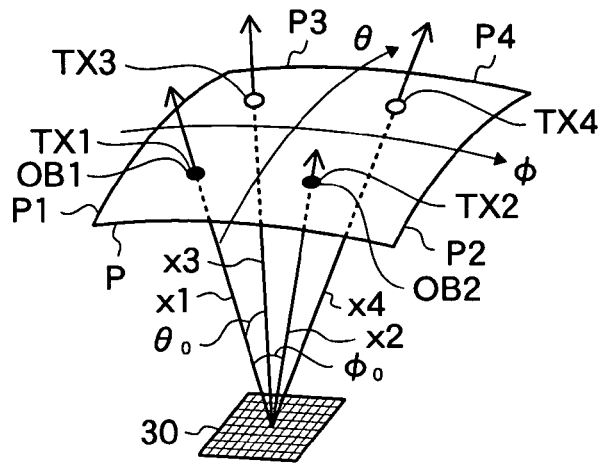
FIGS. 22A–22C are diagrams for illustrating the ultrasonic imaging method according to the fourth embodiment of the present invention.
Figure 22B:
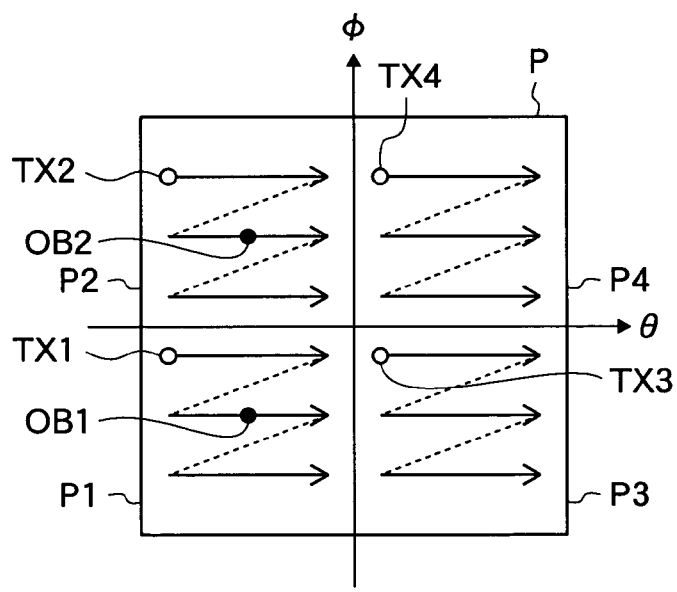
Figure 22C:
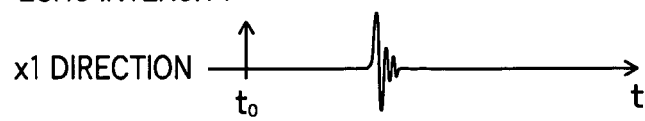
Figure 22C:
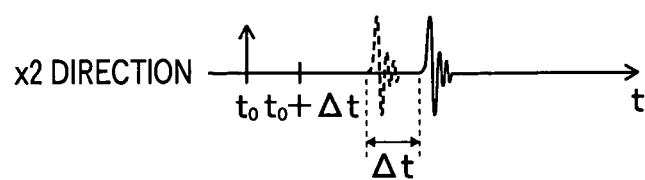

Here, FIGS. 21A and 22A shows the state where the ultrasonic beam is transmitted to three-dimensional regions of an object. The arrows indicate the tracks of the ultrasonic beams TX1–TX4. FIGS. 21B and 22B show a plurality of blocks P1–P4 which are included in the image region at the depth P. The symbols of circle indicate beam spots of the ultrasonic beams TX1–TX4 which scan the plurality of blocks P1–P4 respectively, and the arrows indicate the scanning directions of the ultrasonic beams TX1–TX4. Here, in FIGS. 21A, 21B, 22A and 22B, the symbols of black circle indicate reflection sources OB1 and OB2 which reside in the image region at the depth P. Further, FIGS. 21C and 22C show waveforms of the echo signals which have been obtained corresponding to the transmitted ultrasonic beams.

First, at step S31, as shown in FIG. 21A, a pre-imaging is made by scanning one image region constituting the three-dimensional region within the object with one ultrasonic beam TX1. In the pre-imaging, the ultrasonic imaging method according to the first or second embodiment of the present invention is used.

Owing to this pre-imaging, the waveforms of the echo signals are obtained as shown in FIG. 21C. Thereby, the fact that reflection sources OB1 and OB2 reside in the image region at the depth P is comprehended. In FIG. 21C, t1 and t2 indicate transmission time of an ultrasonic beam TX1 which has been transmitted to the X1 and X2 directions respectively as shown in FIG. 21A.

The sound ray data as to a plurality of scanning lines as described above are inputted to the cross talk determining unit 51.

Then, at step S32, the determination of the cross talk is made. Here, it is assumed that, in the excitation timing controller 20, for example, as shown in FIG. 22A, the transmission timing and the transmitting direction have been initially set up so that the ultrasonic beams TX1, TX2, TX3 and TX4, which are separated from each other by $\theta_0$ and $\phi_0$, are transmitted simultaneously in one transmission of multi-beam.

First, on the basis of the input sound ray data, the cross talk determining unit 51 determines whether or not any reflection source resides in the regions neighboring each other.

For example, from the waveforms as shown in FIG. 21C, it is found that the reflection sources OB1 and OB2 reside in the X1 direction and X2 direction respectively. A time period from a time point when the ultrasonic beam is transmitted to a time point when the ultrasonic echo is received is substantially the same between these reflection sources OB1 and OB2. Accordingly, as shown in FIG. 21A, it is found that these reflection sources OB1 and OB2 are located in positions where the distance from the transmitting point of the transmitted beam is substantially the same, i.e., in an image region having the same depth. In the case where the interval between the X1 direction and the X2 direction is substantially the same as the transmitting interval $\theta_0$ and $\phi_0$ of the plurality of ultrasonic beams to be transmitted simultaneously, and when the ultrasonic beams are transmitted simultaneously in the X1 direction and X2 direction, the detection signal of the ultrasonic echo reflected by the reflection source OB1 and the detection signal of the ultrasonic echo reflected by the reflection source OB2 are detected being overlapped with each other.

In such case, the cross talk determining unit 51 determines that cross-talk will occur between the X1 direction and the X2 direction, and outputs the result thereof to the scan control unit 52.

Then, at step S33, resetting of the scanning conditions is made. On the basis of the determination result which has been outputted from the cross talk determining unit 51, the scan control unit 52 resets the scanning conditions of the ultrasonic beams, which are transmitted at actual imaging, for the excitation timing controller 20. That is, as shown in FIG. 22C, the scan control unit 52 sets up the transmission timing so that, when transmitting the ultrasonic beams in the directions including X1 and X2, the ultrasonic beams TX1, TX3 and TX4 are transmitted simultaneously and the ultrasonic beam TX2 is transmitted after a time Δt has elapsed from the transmission time of the ultrasonic beams TX1, TX3 and TX4.

Then, at step S34, an actual imaging is carried out. That is, according to the control of the excitation timing controller 20 in which the scanning conditions has been reset by the scan control unit 52, the plurality of pulser circuits 21 outputs drive signals to the plurality of ultrasonic transducers 10a connected to the plurality of pulser circuits 21, respectively. Thereby, the plurality of ultrasonic beams of TX1, TX3 and TX4 are transmitted to the directions of x1, x3 and x4 respectively at a time point to, and the ultrasonic beam TX2 is transmitted to the x2 direction at a time point $t_0+\Delta t$, that is, after a time Δt has elapsed from the time point $t_0$.

The plurality of ultrasonic beams, which are transmitted in a multi-beam mode, are reflected respectively within the object, and the ultrasonic echoes generated thereby are received by the ultrasonic probe 10. The plurality of ultrasonic transducers 10a included in the ultrasonic probe 10 outputs a plurality of detection signals in accordance with the received ultrasonic echoes, respectively. These detection signals are input to the corresponding receivers 30 respectively, and after being subjected to a predetermined signal processing and stored temporarily in the memory 41, and inputted to the respective channels of the phase matching calculating unit 50 in parallel.

On the basis of the series of input detection data, the phase matching calculating unit 50 performs reception beam forming so that the ultrasonic echoes, which have returned in the directions of x1, x2, x3 and x4, form reception focuses respectively to generate pieces of sound ray data corresponding to the transmission beams respectively. Thereby, as shown in FIG. 22C, the detection signal of the ultrasonic echo which has been reflected by the reflection source OB1 and the detection signal of the ultrasonic echo which has been reflected by the reflection source OB2 are obtained separately.

Further, the display image calculating unit 45 performs a predetermined image processing of the sound ray data which has been subjected to the reception focus processing in the phase matching calculating unit 50. On the basis of the image data which have been subjected to the image processing, the image display unit 46 displays the ultrasonic image.

As described above, according to this embodiment, the pre-imaging can be carried out at a high speed, therefore the time required for the entire ultrasonic imaging can be reduced. Further, since the scanning conditions including the transmission timings of the ultrasonic beams on the basis of the result of the pre-imaging, the detection signals of the ultrasonic echoes, which are reflected in the neighboring plurality of regions, can be separated. Accordingly, a high quality image data in which the influence of the cross talk is reduced can be obtained at a high speed in a multi-beam transmission mode.

In this embodiment, the scanning conditions are reset on the basis of the determination result of the cross talk determining unit so that the timings for transmitting the ultrasonic beams are displaced. However, the scanning conditions may be reset so that the transmitting directions of the ultrasonic beams are changed or both of the timings and the transmitting directions are changed.

Further, in this embodiment, the ultrasonic imaging method according to the first or second embodiment is used as a pre-imaging for carrying out ultrasonic imaging with a multi-beam system. However, in addition to the above, these ultrasonic imaging methods may be used as the pre-imaging in a variety of ultrasonic imaging.

As described above, according to the present invention, the scanning line density is adaptively changed on the basis of the detected continuity of the boundary of medium. Accordingly, the entire scanning region can be scanned at a high speed while obtaining minute ultrasonic information about the region including critical information.

What is claimed is:

1. An ultrasonic imaging apparatus comprising:
   an ultrasonic probe including a plurality of ultrasonic transducers for transmitting ultrasonic waves in accordance with a plurality of drive signals to form at least one ultrasonic beam toward an object to be inspected and receiving ultrasonic echoes reflected from the object;
   signal processing means at transmitting-side for providing delays to the plurality of drive signals to be supplied to said ultrasonic probe so as to scan the object by using the at least one ultrasonic beam transmitted from said ultrasonic probe with a scanning line density;
   signal processing means at receiving-side for processing a plurality of electric signals obtained by receiving the ultrasonic echoes to obtain a plurality of detection signals representing ultrasonic information along a plurality of scanning lines respectively;
   determination means for determining continuity of a boundary of medium residing within the object on the basis of the plurality of detection signals obtained by said signal processing means at receiving-side; and
   control means for setting up, after setting up a first scanning line density, a second scanning line density higher than the first scanning line density for said signal processing means at transmitting-side on the basis of a determination result of said determination means.

2. An ultrasonic imaging apparatus according to claim 1, wherein:
   said determination means determines the continuity of boundary of medium on the basis of a plurality of detection signals obtained by scanning predetermined scanning regions with the first scanning line density to obtain a region of discontinuous boundary; and
   said control means controls said signal processing means at transmitting-side to scan the region of discontinuous boundary detected by said determination means with the second scanning line density higher than the first scanning line density.

3. An ultrasonic imaging apparatus according to claim 2, wherein said control means controls said signal processing means at transmitting-side to scan, after scanning predetermined scanning regions with the first scanning line density, the region of discontinuous boundary detected by said determination means with the second scanning line density higher than the first scanning line density.

4. An ultrasonic imaging apparatus according to claim 2, wherein said control means controls said signal processing means at transmitting-side to scan, when the region of discontinuous boundary is detected by said determination means, the region of discontinuous boundary prior to remaining scanning regions with the second scanning line density higher than the first scanning line density.

5. An ultrasonic imaging apparatus according to claim 1, wherein;
   said determination means determines, in the case where a changing rate of an amplitude of any one of the plurality of detection signals as to the plurality of scanning lines becomes larger than a predetermined value at a time point, that a boundary of medium resides at a position corresponding to the time point; and said determination means determines, in the case where the time point when a determination has been made that a boundary of medium resides on the basis of a first detection signal as to a first scanning line is included in a predetermined period with reference to a time point when a determination has been made that a boundary of medium resides on the basis of a second detection signal as to a second scanning line adjacent to the first scanning line, that the boundary of medium is continuous as to the first and second detection signals.

6. An ultrasonic imaging apparatus according to claim 2, wherein:

said determination means determines, in the case where a changing rate of an amplitude of any one of the plurality of detection signals as to the plurality of scanning lines becomes larger than a predetermined value at a time point, that a boundary of medium resides at a position corresponding to the time point; and said determination means determines, in the case where the time point when a determination has been made that a boundary of medium resides on the basis of a first detection signal as to a first scanning line is included in a predetermined period with reference to a time point when a determination has been made that a boundary of medium resides on the basis of a second detection signal as to a second scanning line adjacent to the first scanning line, that the boundary of medium is continuous as to the first and second detection signals.

7. An ultrasonic imaging apparatus according to claim 1, wherein:

said signal processing means at receiving-side obtains first to third detection signals representing ultrasonic information along first to third scanning lines, respectively;

said ultrasonic imaging apparatus further comprises calculating means for performing a calculation for estimating a position where a boundary of medium resides in the third scanning line by using at least the first and second detection signals; and said determination means determines whether or not a boundary of medium in the second scanning line and a boundary of medium in the third scanning line are continuous with each other on the basis of the position estimated by said calculating means.

8. An ultrasonic imaging apparatus according to claim 2, wherein:

said signal processing means at receiving-side obtains first to third detection signals representing ultrasonic information alone first to third scanning lines, respectively;

said ultrasonic imaging apparatus further comprises calculating means for performing a calculation for estimating a position where a boundary of medium resides in the third scanning line by using at least the first and second detection signals; and said determination means determines whether or not a boundary of medium in the second scanning line and a boundary of medium in the third scanning line are continuous with each other on the basis of the position estimated by said calculating means.

9. An ultrasonic imaging apparatus according to claim 2, wherein said control means controls said signal processing means at transmitting-side to scan predetermined scanning regions with the first scanning line density and scan the region of discontinuous boundary detected by said determination means with the second scanning line density higher than the first scanning line density thereby performing a pre-imaging, and to perform an actual imaging on the basis of detection signals as to a plurality of scanning lines obtained in the pre-imaging.

10. An ultrasonic imaging apparatus according to claim 9, further comprising:

a second determination means for determining whether or not there resides any reflection source that causes interference between a plurality of ultrasonic echoes, which are generated by being reflected from a plurality of different reflection sources respectively, when the plurality of ultrasonic echoes are received by said ultrasonic probe, on the basis of the detection signals obtained in the pre-imaging, wherein:

said control means sets up scanning conditions including transmission timing of a plurality of ultrasonic beams to be transmitted in a plurality of directions within a predetermined period, on the basis of a determination result of said second determination means; and said signal processing means at transmitting-side provides delays to the plurality of drive signals to be supplied to said ultrasonic probe in accordance with the scanning conditions set up by said control means such that said ultrasonic probe transmits the plurality of ultrasonic beams to scan a plurality of regions within the object respectively.

11. A method of imaging an object to be inspected by using an ultrasonic probe including a plurality of ultrasonic transducers for transmitting ultrasonic waves in accordance with a plurality of drive signals to form at least one ultrasonic beam toward the object and receiving ultrasonic echoes reflected from the object, said method comprising the steps of:

(a) scanning the object by using the at least one ultrasonic beam transmitted from said ultrasonic probe with a first scanning line density while providing delays to the plurality of drive signals to be supplied to the ultrasonic probe;

(b) processing a plurality of electric signals obtained by receiving the ultrasonic echoes to obtain a plurality of detection signals representing ultrasonic information along a plurality of scanning lines respectively;

(c) determining continuity of a boundary of medium residing within the object on the basis of the plurality of detection signals obtained at step (b); and (d) changing density of the plurality of scanning lines from a first scanning line density to a second scanning line density higher than the first scanning line density on the basis of a determination result at step (c) to scan the object.

12. A method according to claim 11, wherein step (c) includes the steps of:

determining, in the case where a changing rate of an amplitude of any one of the plurality of detection signals as to the plurality of scanning lines becomes larger than a predetermined value at a time point, that a boundary of medium resides at a position corresponding to the time point; and determining, in the case where the time point when a determination has been made that a boundary of medium resides on the basis of a first detection signal as to a first scanning line is included in a predetermined period with reference to a time point when a determination has been made that a boundary of medium resides on the basis of a second detection signal as to a second scanning line adjacent to the first scanning line, that the boundary of medium is continuous as to the first and second detection signals.

* * * * *

UNITED STATES PATENT AND TRADEMARK OFFICE
CERTIFICATE OF CORRECTION

PATENT NO. : 6,973,831 B2
DATED : December 13, 2005
INVENTOR(S) : Tomoo Satoh

It is certified that error appears in the above-identified patent and that said Letters Patent is hereby corrected as shown below:

Column 15,
Line 53, delete "alone" and insert -- along --.

Signed and Sealed this

Twenty-eighth Day of February, 2006

JON W. DUDAS
*Director of the United States Patent and Trademark Office*